United States Patent [19]

Nakamura et al.

[11] Patent Number: 4,815,058
[45] Date of Patent: Mar. 21, 1989

[54] OPTICAL INFORMATION PROCESSING APPARATUS

[75] Inventors: Shigeru Nakamura, Hachioji; Yoshito Tsunoda, Mitaka, both of Japan

[73] Assignee: Hitachi, Ltd., Tokyo, Japan

[21] Appl. No.: 920,423

[22] Filed: Oct. 20, 1986

[30] Foreign Application Priority Data

Oct. 21, 1985 [JP] Japan .................................. 60-233238
Nov. 13, 1985 [JP] Japan .................................. 60-252726

[51] Int. Cl.$^4$ ............................................... G11B 7/00
[52] U.S. Cl. ...................................... 369/45; 250/201; 346/76 L; 369/100; 369/112; 369/116
[58] Field of Search ............... 369/122, 121, 100, 102, 369/111, 106, 108, 109, 112, 45, 116, 44; 346/76 L, 108; 250/201; 372/20, 23

[56] References Cited

U.S. PATENT DOCUMENTS

| 4,441,186 | 4/1984 | Erickson | 372/23 |
| 4,450,547 | 5/1984 | Nakamura | 250/204 |
| 4,480,325 | 10/1984 | Aiki | 369/122 |
| 4,679,057 | 7/1987 | Hamoda | 346/108 |
| 4,725,721 | 2/1988 | Nakamura et al. | 369/45 |

Primary Examiner—Steven L. Stephan
Attorney, Agent, or Firm—Antonelli, Terry & Wands

[57] ABSTRACT

An optical information processing device comprises a semiconductor laser, and an optical system including an imaging lens having chromatic aberration for focusing laser light emitted by the semiconductor laser in the form of a spot on an information recording surface. The imaging lens serves for focusing the laser light at different positions along the optical axis for different wavelengths. The information processing device also includes an apparatus for producing relative displacements between the spot and the information recording surface, and an apparatus for varying the wavelength of the light emitted by the semiconductor laser with the device being characterized in that the imaging position of the spot is displaced along the optical axis depending on variations in wavelength of the light emitted by the semiconductor laser and the chromatic aberration of the imaging lens. The focusing control can be effected by driving the wavelength changing apparatus by using focal point detection signals. Further, it is possible to effect multigrade recording by driving the wavelength changing apparatus by multigrade information signals.

14 Claims, 4 Drawing Sheets

OPTICAL INFORMATION PROCESSING APPARATUS

BACKGROUND OF THE INVENTION

This invention relates to an optical information processing apparatus and in particular to an optical information processing apparatus such as laser beam printer, optical disc device, optical card device, etc., which records and/or reproduces information by projecting a laser light spot on an information recording surface by means of a semiconductor laser used as a light source. More in detail it relates to an optical information processing device, in which the focal position of the laser light can be moved optically along the optical axis.

A prior art laser beam printer consisted of a gas laser such as an He-Ne laser, a light intensity modulator, a rotating polygonal mirror, an $F_\theta$ lens, and a light sensitive drum, in which laser light was focused by the $F_\theta$ lens on the surface of the rotating light sensitive drum and recorded information in the form of dots having a constant diameter on the light sensitive drum by modulating the light intensity of the spot by means of the light intensity modulator while scanning the surface of the light sensitive drum with the spot by means of the rotating polygonal mirror. Further, in a laser beam printer using a semiconductor laser as the light source, the emitted light intensity of the semiconductor laser was not modulated by the light intensity modulator but modulated directly in order to record dots having a constant diameter.

In an optical disc device and an optical card device, a laser light spot having a constant diameter was projected on the information recording surface of a rotating disc or a card so that circular pits having a constant diameter or elongated pits having a constant width were formed in order to record and/or reproduce information.

This invention relates to an improvement of the technique for displacing the focal position of the laser light along the optical axis in an optical information processing device, such as these laser printer, optical disc device, optical card device, etc. This technique is necessary for the focusing control to project a spot having a diameter always constant on the information recording surface by making the focal position of the light follow vertical movements (in the direction parallel to an optical axis) of the information recording surface. In addition, this technique is necessary for effecting multigrade recording or multivalue recording to record dots or pits having different diameters by projecting spots having diameters different according to information to be recorded on the information recording surface by displacing the focal position of the laser light to positions along the optical axis, which are different according to the information to be recorded. Heretofore the displacement of the focal position of the laser light along the optical axis was carried out by displacing mechanically a focusing lens along the optical axis by means of a lens actuator. This will be explained below, taking an autofocusing control in an optical disc device as an example.

An autofocusing control system in a prior art optical disc device consisted of a light source such as a semiconductor laser, a focusing lens, light beam separating means, such as a quarter-wavelength plate and a polarization light beam splitter, etc., a focal displacement detection optical system, and a focusing lens actuator. The focusing control was carried out, in order to reduce influences of vertical movements (fluctuations in the optical axis direction of the focusing lens) due to the rotation of the disc, when the light emitted by the semiconductor laser was focused by the focusing lens in the form of a spot on the surface of the disc, by separating light reflected by the disc by means of a quarter-wavelength plate and a polarization light beam splitter, etc., guiding it to the focal displacement detection optical system, detecting deviations of the focal position from the disc surface (focal displacement), driving the lens actuator by using detection signals thus obtained, and displacing only the position of the focusing lens along the optical axis.

The focal depth of the focused spot is given by $\lambda/(NA)^2$, where NA represents the numerical aperture of the focusing lens and $\lambda$ the wavelength of the laser light. For example, when $NA=0.5$ and $\lambda=0.83$ $\mu$m, it is 3.3 $\mu$m. Consequently, when external vibrations and focal displacement detection errors are taken into account, focal displacement should be suppressed to about $\pm 1$ $\mu$m by the lens actuator. On the other hand, the disc rotates usually at a speed of about 30 Hz with fluctuations of about $\pm 200$ $\mu$m. Further there are small fluctuations in one rotation. For this reason, in a prior art autofocusing control system including a lens actuator, a high gain was necessary to suppress focal displacement to about $\pm 1$ $\mu$m and in addition cut-off frequency characteristics as high as several kHz were necessary to make the focusing lens follow focal displacement of several 100 Hz. However, there was a problem that it is difficult to design and fabricate autofocusing control means including a lens actuator, because generally the cut-off frequency is low, when the gain is high. In particular, there was a problem that the cut-off frequency is determined principally by the lens actuator which moves mechanically the lens and therefore it is difficult to suppress also high frequency components of the focal displacement.

Similarly, when the focusing lens is moved under the mechanical control of lens actuator in order to effect multigrade recording, it is not possible to vary the diameter of the spot precisely with a high speed according to multigrade information. Therefore it was impossible to realize the multigrade recording, in which color is varied continuously or stepwise from black to white.

SUMMARY OF THE INVENTION

The object of this invention is to provide an optical information processing device, in which the focal position of the laser light can be moved along the optical axis with a high speed and with a high precision without any mechanical lens displacement means or by using a mechanical lens displacement having low response characteristics.

An optical information processing device according to this invention is characterized in that it comprises a semiconductor laser, an optical system including imaging optical means for focusing laser light emitted by the semiconductor laser in the form of a spot on an information recording surface, the imaging optical means focusing light having different wavelengths at different positions along the optical axis, means for producing relative displacements between the spot and the information recording surface, and wavelength changing means for varying the wavelength of the laser light emitted by the semiconductor laser.

A single mode semiconductor laser is suitable for the semiconductor laser used for realizing this invention. The oscillation wavelength of the semiconductor laser is varied by varying its driving current.

In order to effect the focusing control, positional deviations (focal displacement) of the focal position along the optical axis with respect to the information recording surface are detected and focal displacement detection signals drive the wavelength changing means. The wavelength changing means controls the current driving the semiconductor laser, varies the oscillation wavelength of the semiconductor laser and in this way makes the semiconductor laser emit laser light having different wavelengths. Laser light having different wavelengths, depending on the amount of the focal displacement, is emitted by the semiconductor laser by controlling the current driving the semiconductor laser by means of the focal displacement detection signal. The imaging optical means has chromatic aberration and the focal position is formed at different positions along the optical axis for the laser light having different wavelengths. Consequently the wavelength of the laser light emitted by the semiconductor laser varies, depending on the amount of the focal displacement; the focal position of the laser light is varied by the chromatic aberration of the imaging optical means; a spot having an always constant diameter is formed on the information recording surface; and the automatic focusing control is achieved in this way.

In order to effect multigrade recording, the wavelength changing means is driven by using multigrade information signals to be recorded. That is, laser light having wavelengths, which are different in accordance with information to be recorded is emitted by the semiconductor laser by controlling the current driving the semiconductor laser by means of the multigrade information signals. The imaging optical means has chromatic aberration and varies the focusing position along the optical axis for different wavelengths of the laser light. In this way the wavelength of the laser light varies according to the multigrade information to be recorded; the focal position of the laser light focused on the information recording surface varies along the optical axis; the diameter of the spot on the information recording surface varies; and thus the diameter of the dots or pits recorded on the information recording surface varies, too. In this way, since the ratio of the black portion to the white portion varies, the multigrade recording is realized. Further, when the diameter of the spot on the information recording surface increases according to the multigrade information signal to be recorded, the output of the laser also increases, and since the energy density per unit area within the spot is kept over a certain value necessary for the recording on the information recording surface, dots or pits having diameters corresponding to the multigrade information to be recorded are recorded.

According to this invention, since the focal position of the laser light is displaced optically along the optical axis by variations in wavelength of the semiconductor laser and the chromatic aberration of the imaging optical means, no high precision and high performance lens actuator is necessary for the focusing control. Since the wavelength of the semiconductor laser can be varied with a high speed, the focal position of the laser light can be controlled with a high speed and a high precision. As the result, it is possible to realize a high speed and high precision autofocusing control or a high speed and high precision multigrade recording. Further it is also possible to utilize parallelly a lens actuator having low response characteristics and to suppress high frequency components of the focal displacement by means of using the technique of this invention and suppress low frequency components by means of the lens actuator. In this case, since the lens actuator takes charge only of the low frequency components, the cut-off frequency can be lowered with respect to that of the prior art and design and fabrication become easier.

DESCRIPTION OF THE PREFERRED EMBODIMENTS

Figure 1:
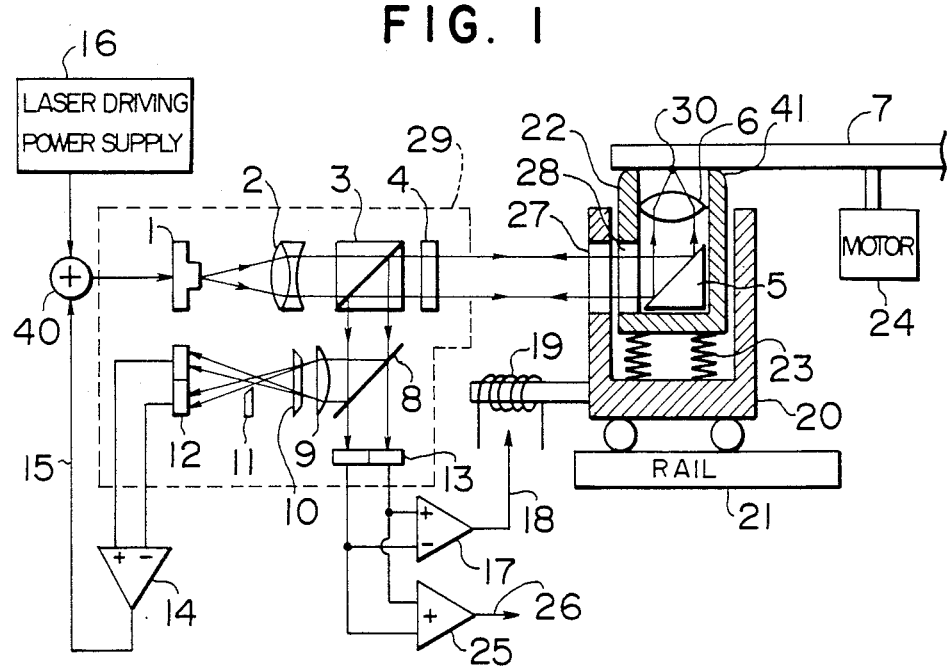
FIG. 1 is a scheme illustrating the construction of an embodiment of optical disc devices according to this invention.

Hereinbelow this invention will be explained in detail, referring to some preferred embodiments. At first, an embodiment will be explained, in which light spot displacement techniques according to this invention are utilized for the focusing control. FIG. 1 is a scheme illustrating the construction of an embodiment of optical disc devices utilizing this invention.

Figure 3:
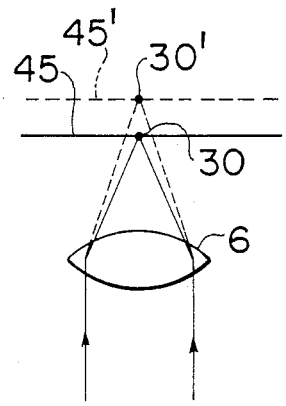
FIGS. 2 and 3 are schemes for explaining the working mode of this invention.
Figure 2:
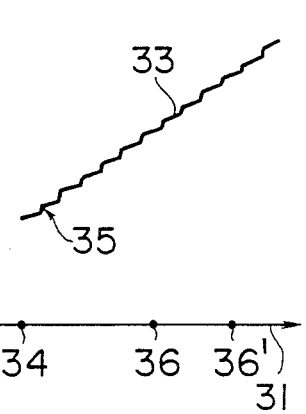

Laser light emitted by a semiconductor laser 1 is transformed into a parallel light beam by a collimating lens 2, which passes through a polarization light beam splitter 3 and a quarter-wavelength plate 4; then passes through holes 27 and 28 formed in a lens displacement table 20 and a lens holder cylinder 22; is reflected by a mirror prism 5 and focused in the form of a spot by a focusing lens 6 on a disc 7. The disc 7 is rotated by a motor 24 and the spot 30 scans the surface of the disc along the rotational direction. The disc 7 has an information recording surface, on which a series of pits are formed along coaxial tracks or a spiral track, where information signals are recorded in an uneven phase structure, or an information recording surface consisting of a recording film, on which recording is made optically, i.e. by local deformation, phase transition, variations in magnetization direction, etc. by irradiation with light. The light reflected by the disc is transformed again into a parallel beam by a focusing lens, which is reflected by the mirror prism 5; split by a polarization operation by means of the quarter-wavelength plate 4 and the polarization prism 3 and led to a half mirror 8. The laser light reflected by the half mirror 8 is led to focal displacement means consisting of e.g. a convex lens 9, a cylindrical lens 10, a knife edge 11, a two divided light detector 12 and a differential circuit 14. Since the detection principle of this focal displacement means has no direct relation with this invention, explanation in detail therefor will be omitted. In brief, a semicircular light beam on the surface of the light detector 12 is rotated due to focal displacements; this rotation is detected by the two divided light detector 12 and the differential circuit 14 and thus a focal displacement signal 15 is outputted. This focal displacement detection means is disclosed in U.S. Pat. No. 4,450,547. On the other hand the laser light, which has passed through the half mirror 8, is received by another two divided light detector 13 and outputs an off-track detection signal 18 by means of a differential circuit 17, which effects tracking control, etc. by moving a lens displacement table 20 in the radial direction of the disc on a rail 21 by means of a well-known electro-magnetic means 19 to which e.g. a voice coil is applied. Explanation therefor will be omitted, because this off-track detection principle and the tracking control don't relate to this invention. Within the lens displacement table 20 is disposed the lens holder cylinder 22 to which the focusing lens 6 and the mirror prism 5 are secured, which cylinder is pushed upward by a spring 23. The surface 41 of the lens holder cylinder 22 on the side of the disc is worked smoothly. The disc 7 is rotated by a motor 24 and an air layer several $\mu$m thick is formed between the surface 41 of the lens holder cylinder and the disc by viscosity of air, utilizing the well-known air floating techniques used for a magnetic disc head, etc. Owing to these techniques focal displacements can be suppressed to about $\pm 2$–3 $\mu$m. However the focal displacements should be suppressed under $\pm 1$ $\mu$m as described above. The focal displacement signal 15 is added to a signal coming from the laser driving power supply 16 in an adder 40 and varies the electric current flowing through the semiconductor laser 1. A single mode semiconductor laser is suitable for the semiconductor laser 1 used for realizing this invention. The wavelength of this semiconductor laser can be varied by varying electric current flowing therethrough. FIG. 2 indicates he relation therebetween with a solid line 33, in which the abscissa 31 represents the electric current flowing through the semiconductor laser and the ordinate 32 the wavelength. For example, for a CSP type laser, the laser oscillation begins at a current value of about 70 mA indicated by a point 34 and the wavelength varies by about 5 nm for a variation of 100 mA of the electric current. However, this variation in wavelength is not smooth, but stepwise in the form of a discontinuous curve with an interval of about 0.3 nm of the wavelength, as indicated by 35 in FIG. 2 (called mode hop). However this discontinuous variation of the wavelength gives rise to no trouble. Further, the focusing lens 6 has chromatic aberration, which e.g. makes the position of the spot move by 1 $\mu$m for a variation of 1 nm of the wavelength. For this purpose a focusing lens made of an optical glass having a great dispersion or a Fresnel lens can be used. FIG. 3 is a scheme for explaining the relation between the spot focused by the focusing lens 6 and the surface 45 of the disc, in which the spot 30 is located on the surface 45 of the disc. At this time the intensity of the laser current is e.g. 120 mA indicated by 36 in FIG. 2 and the wavelength is e.g. 830 nm indicated by 37. In FIG. 3, when the surface of the disc is displaced by 1 $\mu$m to 45' indicated by a broken line, the output of the focal displacement detection signal in FIG. 1 increases from 0 level to a positive voltage. At the same time the laser current increases to 145 mA indicated by 36' in FIG. 2 and the wavelength varies to 831 nm indicated by 37'. Therefore, when the chromatic aberration of the focusing lens is 1 $\mu$m/nm, the focused position moves by 1 $\mu$m along the optical axis and it is imaged on the surface 45' of the disc. In this way the autofocusing control can be achieved.

In this embodiment, the greater the chromatic aberration of the focusing lens is, the larger the range is, where focusing control is possible. However, as stated already, since there are discontinuities with an interval of about 0.3 nm in the variation of the wavelength due to the mode hop, the focal displacement due to a change of 0.3 nm of the wavelength should be smaller than 1 $\mu$m. Consequently the chromatic aberration of the focusing lens 6 may be smaller than about 3 $\mu$m/nm. In this case, since the laser wavelength can be varied by about 5 nm, depending on the current, the range of a focal displacement about $\pm 7.5$ $\mu$m can be controlled. Further, since variations in wavelength of the semiconductor laser are very rapid and they take place in a period of time shorter than 1 microsecond, it is possible to realize an autofocusing control system having excellent response characteristics according to this invention. This invention can be realized, other than by means of the wavelength changing means described in this embodiment, by varying the temperature of the semiconductor laser by means of a Peltier element, etc. Furthermore the focal displacement detection optical system should not be necessarily the one described in this embodiment, but any other focal displacement detection optical system can be used.

Figure 4:
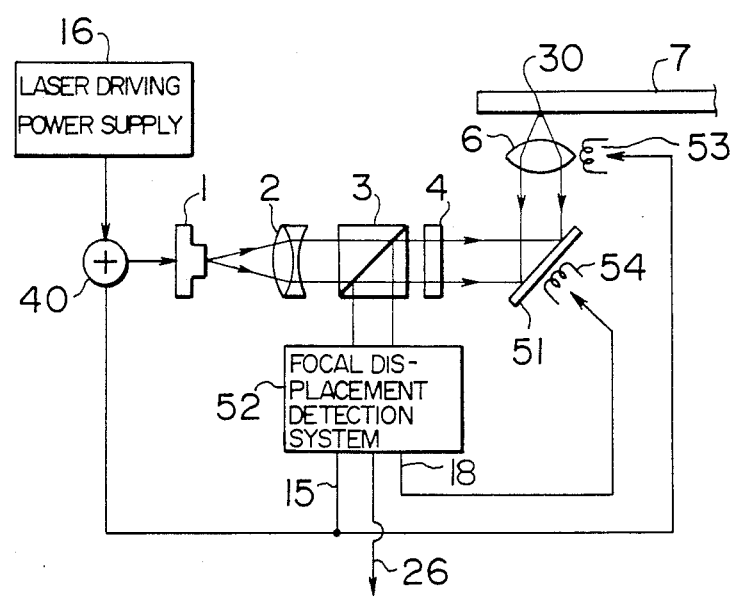
FIG. 4 is a scheme illustrating a modification of the optical disc device indicated in FIG. 1.

FIG. 4 indicates a modification of the optical disc device illustrated in FIG. 1, which is an embodiment, where a focusing lens having chromatic aberration is used together with e.g. a well-known voice coil type lens actuator (electro-magnetic means) 53 mechanically moving it along the optical axis. The items having the same reference numerals as those indicated in FIG. 1 are the same as those explained by referring to FIG. 1. Explanation for their function, etc. will be omitted so as to avoid duplication. The reference numeral 52 includes the focal displacement detection means, the off-track detection means and the information reproduction means, which are described, referring to FIG. 1, and outputs the focal displacement detection signal 15, the off-track detection signal 18 and the information reproduction signal 26. The tracking control is effected by rotating a mirror 51 by means of a well-known electro-magnetic means 54 in accordance with the off-track detection signal 18 so that the spot 30 is displaced in the radial direction on the disc. The focal displacement detection signal 15 varies the electric current driving the semiconductor laser 1 and at the same time drives the lens actuator 53.

That is, the low frequency components of the focal displacement are suppressed by the lens actuator 53 and the high frequency components are suppressed by the autofocusing control mechanism utilizing the combination of the wavelength shift of the semiconductor laser with the chromatic aberration of the focusing lens. In this case, since the lens actuator 53 takes charge only of the low frequency components, the cut-off frequency can be lowered. Contrarily to the fact that, in the prior art autofocusing control means, the focal displacement should be kept under $\pm 1$ $\mu$m, the displacement of the lens actuator kept under $\pm 7.5$ $\mu$m is sufficient according to this invention and therefore design and fabrication of the lens actuator are facilitated very much.

In addition this invention can be applied not only to an optical disc but also to the autofocusing control in any optical information processing device such as optical card device, optical drum device, etc. In this way, when the light spot displacement technique according to this invention is utilized for the focusing control, no mechanical displacement means such as focusing lens actuator are necessary for the focusing control or it is possible to enlarge the limit, within which the focal displacement of the focusing lens should be suppressed, to a value 7.5 times as large as that of the prior art. In this way it is possible to realize an autofocusing control having a rapid response of microsecond order even with a lens actuator having low response characteristics.

Now an embodiment, in which the light spot displacement technique according to this invention is applied to the multigrade recording, will be explained.

Figure 5:
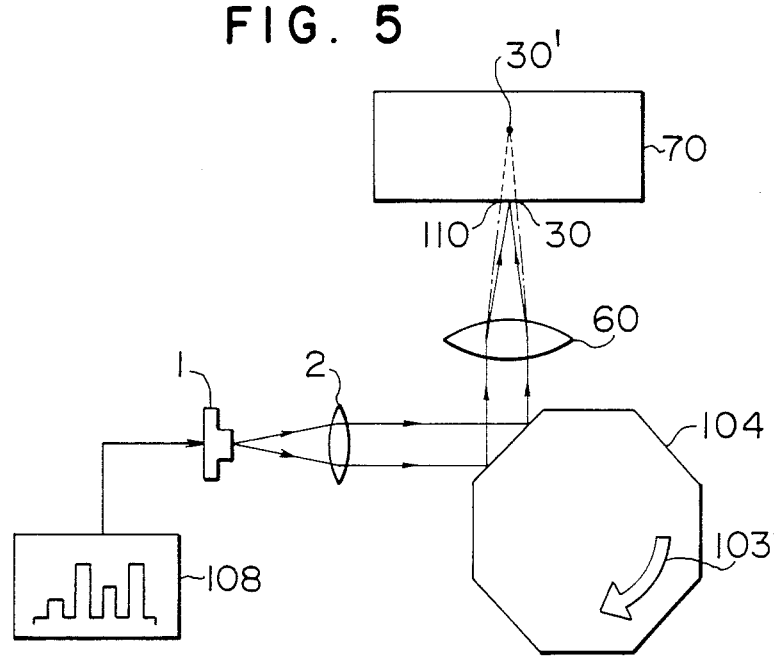
FIG. 5 is a scheme illustrating the construction of an embodiment, in which this invention is applied to a laser beam printer.

FIG. 5 is a scheme illustrating the construction of an embodiment, in which this invention is applied to a laser beam printer. Laser light emitted by the semiconductor laser 1 is transformed into a parallel light beam by the collimating lens 2 and deviated by a rotating polygonal mirror 104 rotating in the direction indicated by an arrow 103. In this way it forms a spot 30 through a focusing lens 60, called $f^\theta$ lens, on the surface of a light sensitive drum 70. A power supply 108 generates pulse signals having amplitudes, which are different in accordance with multigrade information to be recorded and vary the amplitude of the electric current flowing through the semiconductor laser 1 so that the wavelength of the semiconductor laser 1 varies.

Figure 6:
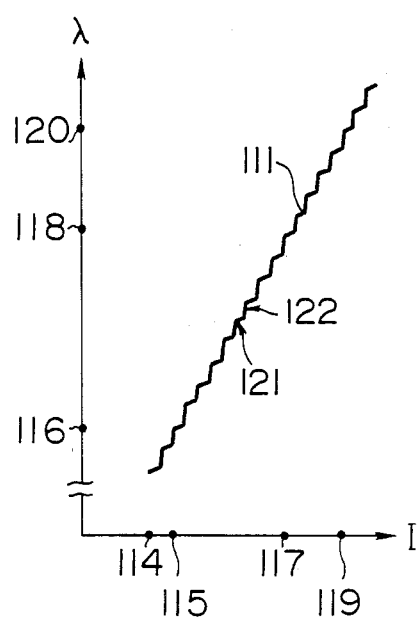
FIGS. 6 and 7 are schemes for explaining the embodiment indicated in FIG. 5.

The solid line 111 in FIG. 6 shows the relation between the electric current flowing through the semiconductor laser 1 and the laser wavelength, where the abscissa represents the intensity I of the current and the ordinate the laser wavelength $\lambda$. For example, the semiconductor laser 1 begins to emit light at a current intensity $I_{th}=50$ mA indicated by 114 and its laser emission output reaches $P_1=6$ mW at a current intensity $I_1=68$ mA indicated by 115, where the wavelength $\lambda_1=780$ nm indicated by 116. At a current intensity $I_2=152$ mA indicated by 117, the laser emission output $P_2=34$ mW, where the wavelength $\lambda_2=782.8$ nm indicated by 118. Further, at a current intensity $I_3=194$ mA indicated by 119, the laser emission output $P_3=48$ mW, where the wavelength is 784.2 nm, indicated by 120. The semiconductor laser 1 oscillates with a wavelength $\lambda$, satisfying $2nL=N\lambda$, where L represents the distance between resonator surfaces at the two extremities of the laser, n is the refraction index and N is an integer. When the current increases, the temperature of the active layer rises and the refraction index n and the length of the resonator L vary continuously, as indicated by a solid segment 121 in FIG. 6. When the current further increases, the semiconductor laser oscillates with the following mode N-1 and shows a discontinuous variation in wavelength as indicated by a solid segment 122. This discontinuous increment in wavelength can be given by $\lambda^2/2nL$, which is equal to about 0.3 nm. In this embodiment, as stated later, discontinuous variations in wavelength, which are as small as 0.3 nm, give rise to no problem. Consequently, when the ratio of the variations in wavelength $\Delta\lambda=(\lambda-\lambda_1)$ to the variations in electric current $\Delta I=(I-I_1)$ up to a current I, taking a current intensity $I_l=68$ mA indicated by 115 as reference, is denoted by $\alpha$, $\alpha=\Delta\lambda/\Delta I=0.0333$ nm/mA.

On the other hand the focusing lens 60 and the collimating lens 2 have chromatic aberration. $f_0$ and $f_1$ being the focal length of the focusing lens 60 and that of the collimating lens, respectively, the amounts of chromatic aberration of these lenses 66 $f_0$ and $\Delta f_1$ can be evaluated with $\Delta f_0=f_0/\nu$ and $\Delta f_1=f_1/\nu$, where $\nu$ is the Abbe's number. An optical glass of $\nu \approx 30$-60 for a difference in wavelength between the F line and the D line of about 170 nm is used often for these lenses. When a material of $\nu=45$ is used for both the lenses, chromatic aberrations for a variation in wavelength $\Delta\lambda_{nm}\Delta f_o=f_0\cdot\Delta\lambda/\nu'$ and $\Delta f_1=f_1\cdot\Delta\lambda/\nu'$ (where $\nu'=45\times170$).

In the case where a current $I_1=68$ mA flows from the power supply 108 through the semiconductor laser and the wavelength $\lambda_1=780$ nm, it is supposed that the best focused point 30 of the laser light is just on the surface of the light sensitive drum so that a spot 30 is formed there. When the current is varied to I in accordance with multigrade information to be recorded, the wavelength varies by $\Delta\lambda=\alpha(I-I_1)$ and the best focal position 30' of the laser light is displaced along the optical axis by $\Delta Z=\Delta f_0+\Delta f_1(f_0/f_1)^2$, where the first term of the right member represents the displacement due to the chromatic aberration of the focusing lens 60 and the second term the displacement due to the chromatic aberration of the collimating lens 2 multiplied by the sum of the axial magnification of the focusing lens 60 and that of the collimating lens 2. In this way a large spot 110 is formed on the surface of the light sensitive drum 70. $\phi$ being the diameter of the laser light beam, which is transformed into a parallel light beam by the collimating lens 2, the diameter S of the spot 110 can be given by $S=\phi\Delta Z/f_0$ and thus $S=(\phi/\nu')\cdot(1+F_0/f_1)\cdot\Delta\lambda$. Consequently, for a same $\Delta\lambda$, S is larger, when $f_0>f_1$, and thus multigrade recording is possible with more grades. Using $\Delta\lambda=\alpha(I-I_0)$, the following equation can be obtained:

$$S=(\alpha\phi/\nu')\cdot(1+f_0/f_1)\cdot(I-I_0) \quad (1)$$

Figure 7:
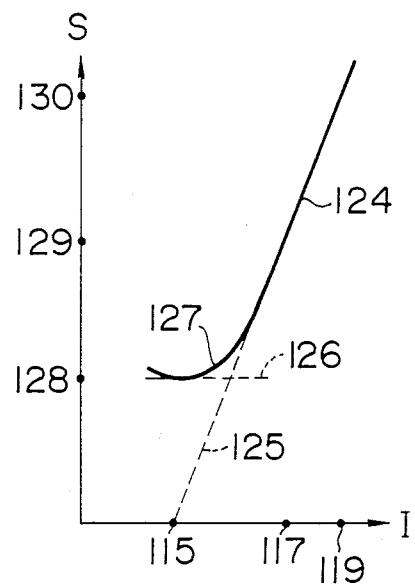

FIG. 7 shows Eq. (1) with a straight line consisting of a solid line 124 and a broken line 125, where the abscissa represents the current intensity I and the ordinate the diameter S of the spot. By Eq. (1), when $I=I_0$, $S=0$. However, since the diameter of the spot at the neighborhood of the best focused point can be represented by $S=2f_0\lambda/\phi$, it varies as indicated by a curve, which is tangent to a line $S=2f_0\lambda/\phi$ indicated by a broken line 126. When $f_0=500$ mm, $f_1=50$ mm, $\phi=20$ mm, and $\alpha=0.0333$ nm/mA, for a current intensity $I_1=68$ mA indicated by 115, $\lambda=780$ nm and $S=39$ μm indicated by 128. When the current intensity $I_2=152$ mA indicated 117, the wavelength varies by $\Delta\lambda=2.8$ nm and the diameter $S=80.4$ μm indicated by 129, what means that the diameter of the spot is about 2 times as large as the initial one. At this time, since the laser emission output $P_2=34$ mW, as stated previously, it is about 5.7 times as large as $P_1=6$ mW at $I_1=68$ mA. Therefore, although the diameter of the spot is approximately doubled, since the spot energy is 5.7 times as high as the initial value, it is sufficient to impress the dot having a doubled diameter on the drum 70. When the current is increased to $I_3=194$ mA indicated by 119, the wavelength varies by $\Delta\lambda=4.2$ nm so that $S=120.7$ μm indicated by 30, i.e. the diameter of the spot is 3 times as large as the initial value. At this time, since the laser emission output $P_3=48$ mW, as stated previously, it is 8 times as large as $P_1=6$ mW at $I_1=68$ mA. Therefore, although the diameter of the spot is approximately tripled since the spot energy is 8 times as high as the initial value, it is possible to impress the dot having a tripled diameter on the drum.

Now influences of the discontinuous variations in wavelength explained, referring to FIG. 6, will be stated below. For example, when the current $I_2=152$ mA, supposing that it gives rise to a variation in wavelength $\Delta\lambda$, which is not 2.8 nm, but 3.1 nm, larger by 0.3 nm than that, the diameter of the spot is not 80.4 μm, but 89.2 μm. However, since this error in the diameter of the spot is smaller than 10%, this produces no problem. In addition, the response time of the variation in the laser wavelength is as short as microseconds and therefore multigrade recording sufficiently rapid is possible.

According to this embodiment it is possible to impress dots having diameters from 39 μm to 120 μm with a high speed on the surface of the light sensitive drum and to realize multigrade information recording with a simple construction.

Figure 8:
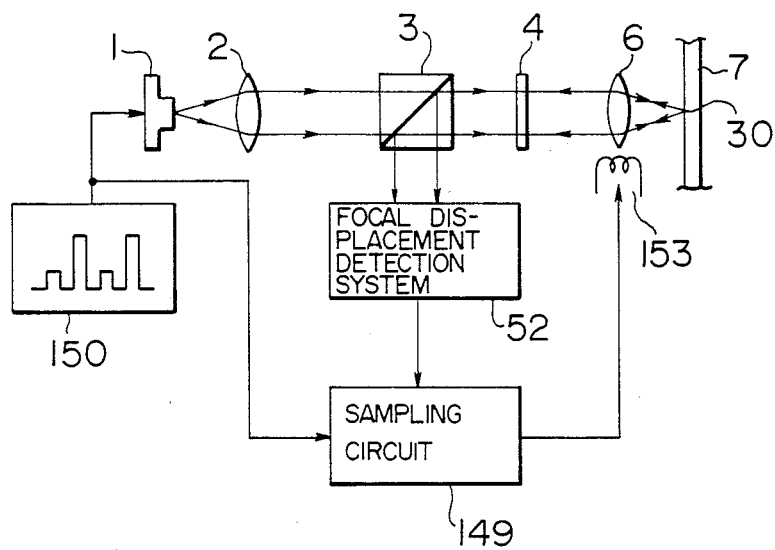
FIG. 8 is a scheme illustrating the construction of an embodiment, in which this invention is applied to an optical disc device.

FIG. 8 is a scheme illustrating the construction of an embodiment, in which this invention is applied to an optical disc device. Laser light emitted by a semiconductor laser 1 is transformed into a parallel beam by a collimating lens 2, which forms a spot 30 through a focusing lens 6 on a disc 7. Light reflected by the disc 7 is led to a well-known focal displacement detection system 52 by a quarter-wavelength plate 4 and a polarized light beam splitter 3. The focal displacement detection system 52 consists of e.g. a convex lens, a cylindrical lens and a four divided light detector and is a focal displacement detection system utilizing variations in beam shape due to astigmatism. Focal displacement detection signals drive an actuator 153 of the focusing lens 6 through a sampling circuit 149 and make the spot 30 follow fluctuations of the disc 7. For example, the semiconductor laser 1 begins to emit laser light at a current intensity of 50 mA and its emission output reaches 4 mW, wavelength 830 nm, at 60 mA; 15 mW, wavelength 830.9 nm, at 88 mA; and 60 mW, wavelength 834.7 nm, at 200 mA. On the other hand, the focal length of the collimating lens $f_1=12$ mm and the focal length of the focusing lens $f_0=4.5$ mm. Both the lenses are made of a substance, whose Abbe's number $\nu=45(\nu'=45\times170)$ for a wavelength between the F line and the D line of about 170 nm and have chromatic aberration. The diameter of the parallel beam $\phi=4.5$ mm. For the reproduction a power supply 150 is so regulated that a current of 60 mA flows through the semiconductor laser, which emits light at 4 mW and the focal displacement detection system 52 is so adjusted that the focused spot of light having a wavelength $\lambda=830$ nm is formed on the surface of the disc 7. A sampling circuit 149 sample-holds focal displacement detection signals, when the semiconductor laser current is smaller than e.g. 80 mA and sends them to the lens actuator 153. In this way, during the reproduction the focusing state is maintained always. The laser power supply 150 transforms the laser current into e.g. 88 mA and 200 mA pulses in accordance with multigrade information signal to be recorded.

Figure 9:
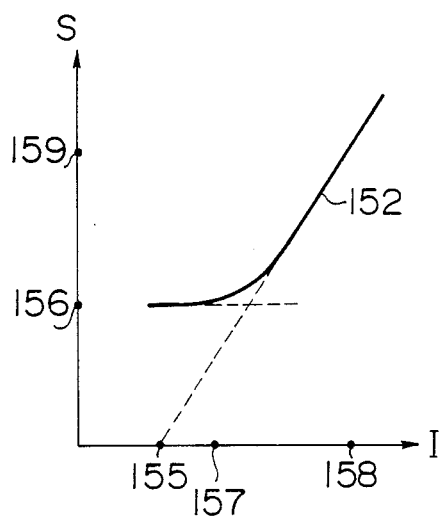
FIG. 9 is a scheme for explaining the working mode of the embodiment indicated in FIG. 8.

The solid line 152 in FIG. 9 shows the relation between the current I and the diameter S of the spot on the surface of the disc 7, where the abscissa represents the former and the ordinate the latter, in the same manner as for FIG. 7. The laser current for the reproduction is 60 mA indicated by 155 and the diameter of the spot is 1.66 μm. When the current is changed to a pulsed current of 88 mA indicated by 157, since the laser power is raised to 15 mW, while the diameter of the spot is kept to 1.66 μm, pits of about 1 μm can be recorded. Next, when the current is changed to a pulsed current of 200 mA indicated by 158, the wavelength varies by $\Delta\lambda=4.7$ nm. The diameter of the spot S is given by $S=(\phi/\nu')\cdot(1+f_0/f_1)\cdot\Delta\lambda$ and $S=3.8$ μm for $\phi=4.5$ mm, $\nu'=45\times170$, $f_0=4.5$ mm $f_1=12$ mm and $\Delta\lambda=4.7$ nm, i.e. the diameter of the spot is approximately doubled. On the other had, since the laser emission output is 60 mW at this time, the spot energy is 60 mW÷15 mW=4 times as large as the initial value. Consequently the energy density per unit area is kept constant and thus it is possible to record pits of about 2 μm. Further, since the sampling circuit 149 allows no focal displacement detection signals to pass through, when the laser current exceeds 80 mA, erroneous focal displacement detection can be prevented. In a prior art device, since recording was effected with a spot having a constant diameter, e.g. 1.66 μm, it was not possible to record pits of 2 μm, larger than the diameter of the spot, as in this embodiment.

According to this invention, it is possible to impress pits of about 1 μm and pits of about 2 μm with a high speed on the surface of an optical disc and to realize multivalue recording in an optical disc device with a simple construction.

It is needless to say that this invention is not restricted to the embodiments described above, but it can be used also e.g. for hologram lens, grating, etc.

As explained above, since multigrade information recording or multivalue information recording with a high speed and a high precision is possible with a simple construction according to the spot displacement technique of this invention, it is efficacious for realizing increase of the capacity of half tone copy or an optical disk.

We claim:

1. An optical information processing device comprising:
    a semiconductor laser;
    an optical system including imaging optical means having chromatic abberration for focusing laser light emitted by said semiconductor laser in the form of a spot on an information recording surface;
    means for producing relative displacements between said spot and said information recording surface; and
    wavelength changing means for varying the wavelength of said laser light by controlling driving current for said semiconductor laser, laser light having different wavelengths being focused by said imaging optical means having chromatic aberration at different positions along the optical axis.

2. An optical information processing device according to claim 1, further comprising focal displacement detection means, which detects deviations between said information recording surface and the focusing point of said spot and outputs focal point detection signals representing said deviations, said focal point detection signals driving said wavelength changing means.

3. An optical information processing device according to claim 1, further comprising signal generation means generating pulse signals having amplitudes, which are different in accordance with information to be recorded, said pulse signals driving said wavelength changing means.

4. An optical information processing device according to claim 2, further comprising displacement means for displacing said imaging optical means depending on fluctuations of said information recording surface so as to reduce the displacement amount of the imaging point necessary for obtaining the agreement between the imaging point of said spot and said information recording surface.

5. An optical information processing device according to claim 4, in which said displacement means is air floating means utilizing an air layer formed between said information recording surface and said imaging optical means.

6. An optical information processing device according to claim 4, in which said displacement means is electro-magnetic drive means, which is driven by said focal displacement signal and displaces said imaging optical means along the optical axis.

7. An optical information processing device according to claim 3, in which said imaging optical means consists of at least two groups of lenses having chromatic abberation separated from each other.

8. An optical information processing device according to claim 7, in which the focal length of the group of focusing lenses, which is the nearest to said information recording medium among said at least two groups of lenses, is longer at least than that of the group of focusing lenses, which is disposed on the side of said semiconductor laser.

9. An optical information processing device according to claim 2, in which said optical system includes optical means taking out light reflected by said information recording surface, separating it from the laser light emitted by said semiconductor laser, and said focal displacement detection means is one for detecting said deviations by using said reflected light taken out from said optical means.

10. An optical information processing device comprising:
a semiconductor laser;
an optical system including imaging optical means having chromatic aberration for focusing laser light emitted by said semiconductor laser in the form of a spot on an information recording surface, said imaging optical means having chromatic aberration focusing light having different wavelengths at different positions along the optical axis;
means for producing relative displacements between said spot and said information recording surface; and
wavelength changing means for varying the wavelength of said laser light emitted by said semiconductor laser, said wavelength changing means varying the driving current for said semiconductor laser.

11. An optical information processing device comprising:
a semiconductor laser;
an optical system including imaging optical means having chromatic abberration for focusing laser light emitted by said semiconductor laser in the form of a spot on an information recording surface, said imaging optical means having chromatic aberration focusing light having different wavelengths at different positions along the optical axis;
means for producing relative displacements between said spot and said information recording surface; and
wavelength changing means for varying the wavelength of said laser light emitted by said semiconductor laser; and
signal generation means generating pulse signals having amplitudes, which are different in accordance with information to be recorded, said pulse signals driving said wavelength changing means.

12. An optical information processing device according to claim 11, in which said information recording surface is the surface of a light sensitive drum.

13. An optical information processing device according to claim 11, in which said information recording surface is a surface of an optical disc.

14. An optical information processing device comprising:
a recording optical system consisting of a semiconductor laser and imaging optical means having a chromatic aberration for focusing laser light emitted by said semiconductor laser in the form of a spot on a surface of an information recording medium; and
wavelength changing means for varying the wavelength of the light emitted by said semiconductor laser in accordance with information to be recorded;
whereby said imaging optical means having chromatic aberration forms spots having different diameters for different wavelengths of the laser light.

* * * * *